(12) United States Patent
Krishnamurthi

(10) Patent No.: US 9,672,049 B2
(45) Date of Patent: Jun. 6, 2017

(54) DYNAMIC AND CONFIGURABLE USER INTERFACE

(75) Inventor: Govindarajan Krishnamurthi, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 13/344,735

(22) Filed: Jan. 6, 2012

(65) Prior Publication Data

US 2013/0080890 A1    Mar. 28, 2013

Related U.S. Application Data

(60) Provisional application No. 61/537,684, filed on Sep. 22, 2011.

(51) Int. Cl.
| | |
|---|---|
| *G06F 3/00* | (2006.01) |
| *G06F 9/44* | (2006.01) |
| *H04W 4/00* | (2009.01) |
| *H04W 4/20* | (2009.01) |
| *G06F 3/0482* | (2013.01) |
| *G06F 3/0481* | (2013.01) |
| *G06F 3/01* | (2006.01) |
| *G06F 3/0488* | (2013.01) |

(52) U.S. Cl.
CPC ........ *G06F 9/4443* (2013.01); *G06F 3/04886* (2013.01); *H04W 4/001* (2013.01); *H04W 4/20* (2013.01); *G06F 3/016* (2013.01); *G06F 3/0481* (2013.01); *G06F 3/0482* (2013.01); *G06F 3/0488* (2013.01)

(58) Field of Classification Search
USPC .......... 715/702, 863, 864, 763, 854
See application file for complete search history.

(56) References Cited

U.S. PATENT DOCUMENTS

| | | |
|---|---|---|
| 6,211,858 B1 | 4/2001 | Moon et al. |
| 6,668,177 B2 | 12/2003 | Salmimaa et al. |

(Continued)

FOREIGN PATENT DOCUMENTS

| | | |
|---|---|---|
| CN | 1518704 A | 8/2004 |
| CN | 1902575 A | 1/2007 |

(Continued)

OTHER PUBLICATIONS

Noor Khan, Non-instrusive security, Mar. 29, 2010, The New Straits Times Press (M) Berhad, pp. 1-8.*

(Continued)

*Primary Examiner* — Linh K Pham
*Assistant Examiner* — Tam Tran
(74) *Attorney, Agent, or Firm* — Kilpatrick Townsend & Stockton, LLP

(57) ABSTRACT

In some embodiments, a method for generating a mobile device's user interface is provided. The method may include: receiving, via the mobile device, input from a user of the mobile device, the input being related to a property for presenting dynamic context-dependent informational cues; determining a context; identifying a subset of a set of informational cues, the subset being associated with the context; and predominately presenting, via the mobile device, the identified subset to the user, the presentation being predominate as compared to any presentation of other informational cues in the set of informational cues, wherein the presentation accords with the received user input.

39 Claims, 8 Drawing Sheets

(56) References Cited

U.S. PATENT DOCUMENTS

| | | | |
|---|---|---|---|
| 7,386,279 | B2 | 6/2008 | Wagner et al. |
| 7,620,894 | B1* | 11/2009 | Kahn ................... G06F 3/0481 |
| | | | 715/707 |
| 2004/0155909 | A1* | 8/2004 | Wagner ......................... 345/854 |
| 2005/0209994 | A1 | 9/2005 | Noro et al. |
| 2006/0053392 | A1* | 3/2006 | Salmimaa et al. ............ 715/864 |
| 2006/0107219 | A1 | 5/2006 | Ahya et al. |
| 2008/0148150 | A1* | 6/2008 | Mall ............................. 715/707 |
| 2008/0162649 | A1 | 7/2008 | Lee et al. |
| 2009/0150807 | A1* | 6/2009 | George et al. ................ 715/763 |
| 2009/0187466 | A1* | 7/2009 | Carter et al. ................... 705/10 |
| 2010/0088639 | A1 | 4/2010 | Yach et al. |
| 2010/0317371 | A1 | 12/2010 | Westerinen et al. |
| 2011/0072492 | A1* | 3/2011 | Mohler et al. .................... 726/3 |
| 2011/0154216 | A1 | 6/2011 | Aritsuka et al. |
| 2012/0124515 | A1* | 5/2012 | Li et al. ......................... 715/808 |
| 2012/0242482 | A1* | 9/2012 | Elumalai et al. ......... 340/539.13 |

FOREIGN PATENT DOCUMENTS

| | | |
|---|---|---|
| EP | 1265157 A2 | 12/2002 |
| EP | 1473911 A1 | 11/2004 |
| EP | 1475731 A1 | 11/2004 |
| EP | 1659766 A1 | 5/2006 |
| JP | 2005266945 A | 9/2005 |
| JP | 2008015971 A | 1/2008 |
| JP | 2010146286 A | 7/2010 |
| JP | 2011100279 A | 5/2011 |
| JP | 2011128941 A | 6/2011 |

OTHER PUBLICATIONS

Weblog post, Samsung Fascinate review, Sep. 7, 2010, Newstex, pp. 1-4.*

Gronli, et al. "Integrated Context-Aware and Cloud-Based Adaptive Home Screens for Android Phones," Home Computer Interaction, Part II, HCII 2011, LNCS 6762, pp. 427-438, doi : 10.1007/978-3-642-21605-3_47. Retrieved on Jul. 29, 2001 from http://www.springerlink.com/content/b00v3g6102j07107/fulltext.pdf.

International Search Report and Written Opinion—PCT/US2012/054834—ISA/EPO—Nov. 15, 2012.

Yuasa A., How to Build "My Portal" to Improve Your Information Collecting—Make up your own online newspaper! So, you view it every day.—ASCII. PC, Japan, ASCII Corporation, 2006, Apr. 1, vol. 9, No. 4, pp. 138-149.

* cited by examiner

DYNAMIC AND CONFIGURABLE USER INTERFACE

CROSS-REFERENCES TO RELATED APPLICATIONS

The present application is a non-provisional patent application, claiming the benefit of priority of U.S. Provisional Application No. 61/537,684, filed on Sep. 22, 2011, entitled, "DYNAMIC AND CONFIGURABLE USER INTERFACE," which is hereby incorporated by reference in its entirety.

BACKGROUND

Mobile devices are increasingly prevalent and versatile. For example, a diverse set of programs can be executed on cellular phones and personal digital assistants (PDAs). Additionally, mobile devices can present a user with many types of information (e.g., news or instructional tutorials). A mobile device's user interface may allow a user to select a program to execute (e.g., by selecting a graphical icon associated with the program) and/or to view specific available information. If the user is unable to easily select the program or view the information, the program's or information's value is decreased. Thus, it is important to provide a user interface that allows a user to easily access desired programs and information.

SUMMARY

Techniques are provided to improve user interfaces available to users of mobile devices. A dynamically configured user interface or display may be generated to present informational cues identifying available programs and/or types of information (e.g., alerts) to a user differently depending on a given context. For example, informational cues (e.g., graphical icons) associated with a subset of programs and/or information types may be identified based on a context and presented to the user (e.g., using a graphical icon, an animated visual presentation, sound, etc.). Meanwhile, in some instances, informational cues associated with other programs and/or information types not associated with the context are not presented or are presented less prominently (e.g., using a smaller icon size, less or no animation, less or no sound, etc.). A user may at least partly define a property related to presentation of context-associated informational cues. For example, a user may at least partly define a dynamic portion of a screen, wherein the presentation of informational cues in the dynamic portion changes depending on context (e.g., changing the identity of the informational cues presented or other presentation properties of the cues). A user may: define a perimeter of the dynamic area using a touch screen, select between system-provided options of dynamic-area configurations, identify a percentage of the screen to be dynamic, etc. Contexts may then be determined based on user input or system inferences. A subset of programs and/or information types may be associated with the context based on user inputs and/or system algorithms (e.g., use of a neural network). The subset may include programs and/or information types predicted or known to be of enhanced interest given the context. Informational cues associated with the subset may be presented to the user in a predominate manner (e.g., only displaying graphical icons or text for the subset in the dynamic portion, animating presentations of the subset, playing sound clip(s) linked to one or more of the subset, etc.). The user may then be able to easily identify and access the programs and/or information types of particular interest given the context.

In some embodiments, a method for generating a mobile device's user interface is provided. The method may include: receiving, via the mobile device, input from a user of the mobile device, the input being related to a property for presenting dynamic context-dependent informational cues; determining a context; identifying a subset of a set of informational cues, the subset being associated with the context; and predominately presenting, via the mobile device, the identified subset to the user, the presentation being predominate as compared to any presentation of other informational cues in the set of informational cues, wherein the presentation accords with the received user input. The set of informational cues may include a graphical icon associated with a program, the program being executable on the mobile device. The set of informational cues may include an alert of the context. The set of informational cues may include an alert of a deal. The context may be determined based on previously received context-defining user input. The previously received context-defining user input may identify one or more conditions for displaying the subset of the set of informational cues. The one or more conditions may include receiving an email from one or more specific senders. The input may include an actual or approximate border of a dynamic portion of a screen on the mobile device for visually presenting the identified subset. The input may include one or more touch-screen-drawn borders. The dynamic portion may include a plurality of regions of a screen on the mobile device, the plurality of regions covering less than an entirety of the screen. The identified subset may be visually presented within a system-defined portion of a screen on the mobile device. One or more informational cues of the set of informational cues are associated with a plurality of contexts. The identified subset may be presented with at least one scrolling feature, such that the identified subset is not simultaneously presented in its entirety on a screen of the mobile device. The method may further include: ranking at least some of the informational cues of the set of informational cues, wherein the presentation of the identified subset is based at least partly on the ranking. A screen location associated with the presentation of each of the informational cues of the identified subset of the set of informational cues may be based at least partly on the ranking. The input may include a selection between a plurality of system-generated screen partitioning options. Predominately presenting the identified subset may include predominately displaying graphical icons associated with the subset as compared to any display of graphical icons associated with the other informational cues in the set of informational cues. In some instances, informational cues in the subset are visually presented to the user on a display screen of the mobile device, and the other informational cues are not visually presented to the user on the display screen. In some instances, informational cues in the subset are visually presented to the user on a desktop or home screen of the mobile device, and the other informational cues are not visually presented to the user on the desktop or home screen. The subset may include an informational cue indicating that the context was determined. The informational cue indicating that the context was determined may be presented to the user using a at least one of a sound and a vibration of the mobile device. The context may be an environmental context. The method may further include presenting, via the mobile device, a static context-independent set of informational cues to the user. The mobile device may be a cellular phone. The method may further include:

receiving one or more context-associated variables, wherein determining the context comprises inferring the context based on the received one or more context-associated variables. The method may further include: determining a second context; identifying a second subset of the dynamic set of informational cues, the second subset being associated with the second context; and predominately presenting, via the mobile device, the second subset as compared to any presentation of other informational cues in the dynamic set, wherein the presentation accords with the received user input, and wherein the second subset is different than the subset. The subset may be identified based at least partly on user inputs associating programs with the context, the programs being executable on the mobile device. The method may further include: monitoring the user's interactions with programs executable on the mobile device; identifying a correlation between the user's interactions and a context-associated variable; receiving a value of the context-associated variable; and inferring the context based on the identified correlation and the received value.

In some embodiments, a system for generating a mobile device's user interface is provided. The system may include: an input component configured to receive input from a user of the mobile device, the input being related to a property for presenting dynamic context-dependent informational cues; a context detector configured to determine a context; an associator configured to associate the determined context with a subset of a set of informational cues; and a user interface generator configured to generate a user interface that predominately presents the subset as compared to any presentation of other informational cues in the set of informational cues, wherein the presentation of the subset accords with the received user input. The user interface generator may include a display apportioner to define a portion of a display of the mobile device for displaying the dynamic context-dependent informational cues, the definition depending on the user input. The context detector may include an adaptive model configured to at least periodically adjust a plurality of context definitions. The associator may include an adaptive model configured to at least periodically adjust associations between contexts and portions of the dynamic set of informational cues.

In some embodiments, a system for generating a mobile device's user interface is provided. The system may include: an input device configured to receive an input from a user of the mobile device, the input being related to a property for presenting dynamic context-dependent informational cues; and one or more processors programmed with computer-executable instructions to: determine a context; identify a subset of a set of informational cues, the subset being associated with the context; and generate a user interface to predominately present the identified subset to the user, the presentation being predominate as compared to any presentation of other informational cues in the set of informational cues, wherein the presentation accords with the received user input. The mobile device may include the one or more processors. An external computer may include at least one of the one or more processors, and wherein the external computer is coupled to the mobile device via a wireless connection. The mobile device may further include one or more sensors configured to monitor one or more context-associated variables.

In some embodiments, a system for generating a user interface is provided. The system may include: means for receiving input from a user of a mobile device, the input being related to a property for presenting dynamic context-dependent informational cues; means for determining a context; means for identifying a subset of a set of informational cues, the subset being associated with the context; and means for predominately presenting the identified subset as compared to any presentation of other informational cues in the set of informational cues, wherein the presentation accords with the received user input. The means for determining the context may include using a clustering algorithm. The means for identifying the subset may include using a neural network. The input-receiving means may include a touch screen.

DETAILED DESCRIPTION

Figure 1:
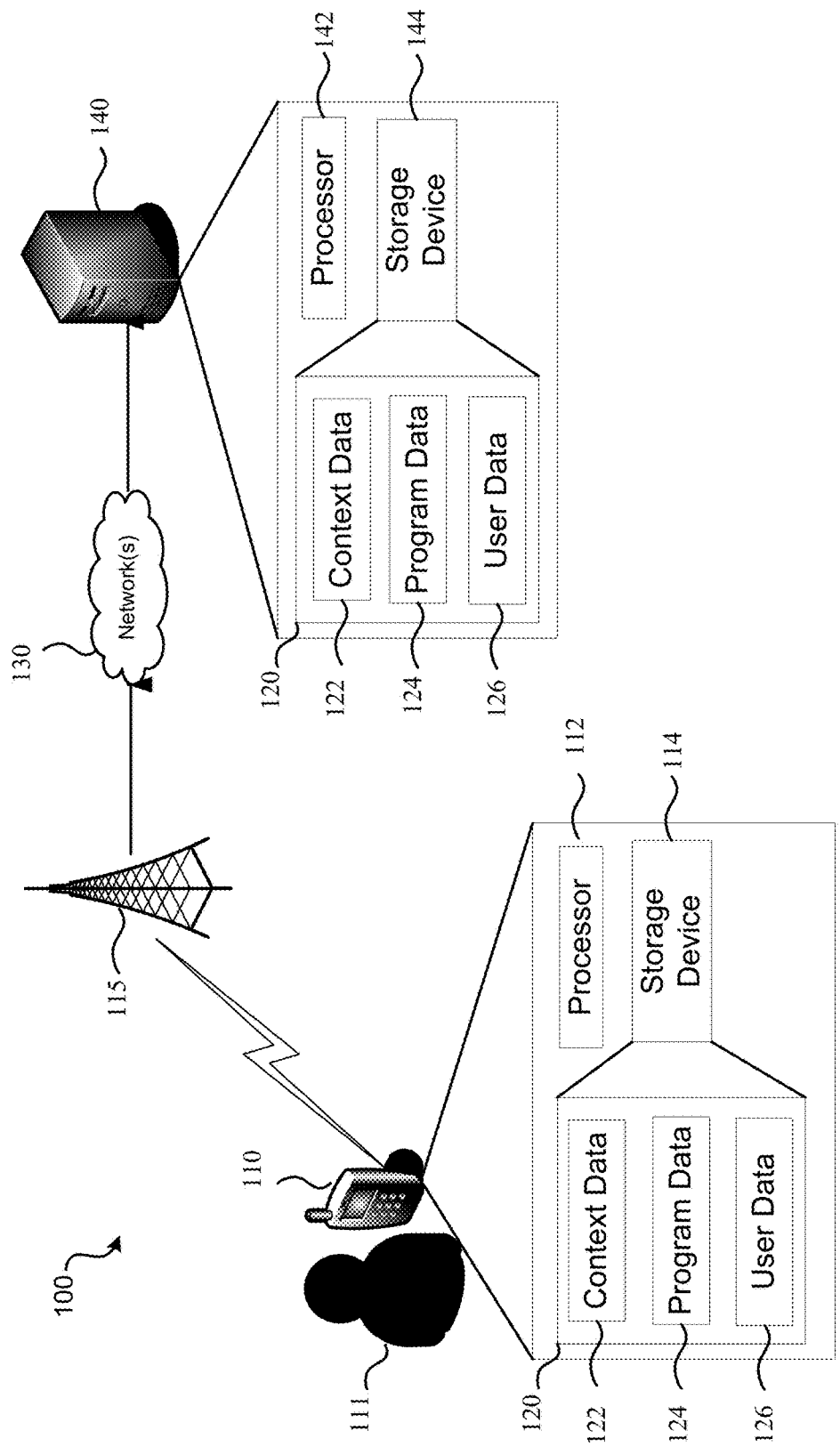
FIG. 1 shows an embodiment of a system for generating a user interface for a mobile device.

Methods, devices and systems are provided to improve user interfaces available to users of mobile devices. Mobile devices now support a large number of programs and information types. However, it may be undesirable or impossible to present a user of informational cues identifying all available programs and types of information given a small size of a mobile device's display. Some embodiments of the invention relate to generating a dynamically configured user interface or display. A user may at least partly define a property related to the dynamic user interface or display. For example, a user may at least partly define a portion of the screen in which the presentation of informational cues changes across contexts. A context may be determined based on, e.g., user input or system inferences. Particular informational cues (e.g., each of which may identify an available program or present information of a particular type) may be associated with the context (e.g., based on user inputs or system analyses). A user interface may be configured to allow a user to easily identify and/or access a program or information associated with a particular informational cue. For example, a defined dynamic portion of a screen may display graphical icons or text associated only with the particular programs, the presentations of the particular programs may be emphasized (e.g., by increasing icon size, adding animation, adding icon-linked sound clips, etc.), and/or the user may be alerted as to a context or associated program/information type (e.g., via vibrating of the device, a sound signal, a flashing display, etc.).

In some instances, a context is an environmental context. An environmental context may include, for example, a location context (e.g., downtown San Diego, 15 Main Street, "work" location, outside, GPS coordinates, near State of Liberty, near Moe's Pizza, near rest stop, etc.), a setting context (e.g., travel, work, home, etc.), an activity context (e.g., baseball game, movie, meeting, dinner, studying, etc.), an associated-people context (e.g., meeting with Betty, Bill is nearby, Ann is speaking, Peter is likely nearby, etc.), or time context (e.g., Monday, weekend, evening, 9:00 PM, January, etc.). In some instances, a context is an event-detection context. An event-detection context may include detection of, for example, a user action (e.g., selection of an icon, typing particular keys, specific interaction with a program, non-use of the device for a period of time, maintained typing, viewing documents, etc.), a program's initiation, or a trigger (e.g., detected by a program). The trigger may be independent of the user/device such that it is substantially unaffected by the existence of a user/device (e.g., a trigger based on: a stock price change, a weather advisory, a deal on flight tickets, a sale on a pair of shoes, an update on another's social networking account, publication of a new issue by a particular journal, publication of a new article on a particular topic, etc.). In other instances, the trigger is at least partly dependent on the user/device (e.g., a trigger based on a mobile device's battery, a new email received by a user account, etc.).

Some contexts may be mutually exclusive (e.g., morning and evening or Moe's Pizza and work), while others may not be (e.g., morning and at home). Contexts may or may not be pre-defined (e.g., based on pre-sale settings). In some embodiments, for example, a context is defined based on observing particular values of context-associated variables repeatedly, as described in more detail below. A context may or may not be given a specific name (e.g., "Home") or a generic name (e.g., "Context A."). In some embodiments, a user may input a name of a pre-defined or learned context.

As described in greater detail below, after a context is determined, a display may be configured to present informational cues to notify a user of programs and/or information types likely to be of interest. As one example, a system may infer that a user in an "office" context based on a phone's GPS data and/or based on a time of day, or a user may input data into the device specifying that he is in the "office" context. A system may identify an email application and technology-development information as being a work related, as a user frequently uses the program and accesses the information type while in the work context. Dictation and scanning applications may also be identified as work-related programs based on user input associating the applications with the work context. Other applications (e.g., sports-news application or exercise-logging application) and information types (e.g., golf news) are not associated with the work context but are associated with other contexts. The work-associated programs are then predominately presented to the user. For instance, a user may have defined a portion of his screen to be "dynamic". User- or machine-selectable icons or text associated only with work-related applications and/or information types may then be displayed in this portion. One or more other screen portions may be static and display icons and/or information (e.g., a web-browsing application icon, phone application icon and weather information) independent of the context. In this manner, a user may easily access programs and types of information most likely to be of use given the context.

As another example, an application may operate to track a server for a deal. Detection of a deal may be defined as an event-detection context. A user interface may then be configured to alert a user of the deal or context (e.g., by presenting an alert icon, presenting an associated application's icon, changing a presentation or appearance of an associated application's icon, presenting alert or context information, vibrating a device, playing a tone, etc.). Specific programs or program features (e.g., to purchase the deal) may also be presented to the user. The alert may include animation (e.g., by animating an alert icon) and/or the a device may emit a sound signal.

FIG. 1 shows an embodiment of a system 100 for generating a user interface for a mobile device. The system may include a mobile device 110 that can communicate with a remote server 140 via a wireless network 115 and network(s) 130 (which may comprise a cloud network). Wireless network 115 can represent a cellular service provider's wireless network. Wireless network 115 can use one or more network(s) 130 to communicate with remote server 140. Networks(s) 130 can include one or more private networks, such as a corporate intranet, and/or one or more public networks, such as the Internet.

Mobile device 110 can represent a cellular phone or some other mobile computerized device, such as a PDA, tablet computer, laptop, handheld gaming device, digital camera, etc. Mobile device 110 can include a microphone which can collect or capture audio data from the mobile device's surrounding physical environment (e.g., speech spoken by a person 111). Mobile device 110 may include a speaker to emit audio signals.

Mobile device 110 may also include a display (e.g., a touch screen display). The display may be configured to present available programs and/or information to a user. For example, user-selectable graphical icons or text associated with each or a plurality of programs and/or types of information may be displayed. The display may have a length and/or a width at least about, about or less than about 0.5, 1, 2, 3, 5, 10, 12, 14, 20, 25, 30, 40 or 50 inches.

Mobile device 110 may include a user input component. The user input component may be configured to receive input from a user, such as a selection of a program to execute, a selection of a type of information to view, or a setting of a user preference. The user input component may comprise a keypad (e.g., a numeric and/or alphabetical keypad) and/or a microphone (e.g., coupled with voice-recognition software). The user input component may include a mouse, a tablet pen and/or a touch screen.

System 100 may include one or more sensors. In some embodiments, mobile device 110 includes one or more sensors (e.g., a light-detection sensor, a noise sensor, a pressure sensor, a location sensor, a GPS, etc.). In some embodiments, one or more sensors are external to mobile device 110. For example, a mobile device's location sensor may indicate that the device is in "San Diego" and an external sensor may identify a temperature of San Diego. External sensors may be in wireless communication with mobile device 110 and/or remote server 140.

Mobile device 110 can include a processor 112 and storage device 114. Remote server 140 can include a processor 142 and storage device 144. Though "storage device" and "processor" are referred to herein using a singular tense, multiple storages devices and processors may be instead used. Storage device 114 or 144 can store data 120, such as context data 122, program data 124 and/or user data 126. Some or all of the data 120 may be specific to individual users or mobile devices. Stored data 120 can be used to determine a current or recent mobile-device context and/or determine programs and/or information types associated with the context. Associated programs and/or information types may be determined in any suitable manner and through use of any suitable form of data. For example, programs of interest can be predicted based at least partly on data relating to a location of a mobile device, a calendar associated with a mobile device, a time of day, a nearby landmark, a user's input, etc.

Context data 122 may include context-associated variables and/or a plurality of contexts. For example, context data 122 may include a set of GPS coordinates that are associated with a context of "home." Examples of contexts are provided above.

Context-associated variables may include any variables that may assist in a determination of a current, near-future or future context. Examples of context-associated variables include: GPS coordinates; user inputs (e.g., specifically identifying a context or initiating a program's execution); device signal strength; detection of nearby Bluetooth devices; proximity to a sensor; identification of a nearby speaker; recognition of spoken words; emails or calendars identifying a single-occurrence or repeated activity or event; user-specific or general calendar events (e.g., meeting with Bob at 1 PM or Christmas); time data (e.g., date, day of the week, time of day, etc.); publicly transmitted data and/or data received over a network (e.g., stock prices, weather, publications, product deals, etc.); device history (e.g., use of particular program, times that the device was on/off, etc.); and user-defined triggers (e.g., deal price notification triggers, stock price notification triggers, website update notification triggers, etc.).

For example, context-associated variables of GPS coordinates (indicating that a device is downtown), time data (indicating that it is 3 PM on a Monday), user activity (indicating that a user just executed a dictation program), and speaker identification (identifying a nearby speaker is identified as a user's boss) may allow a processor to infer that the device and user are in a "work" context. As another example, context-associated variables of flight-price check (indicating that a flight between San Diego and San Francisco is available for $130) and a user-defined trigger (indicating a trigger for flights between these locations at $140) may allow a processor to infer a flight-price-detection event context.

In some embodiments, context data includes a list of contexts. For example, a user may input one or more context headings (e.g., "Work", "Home", "Context A", "Vacation", "Misc", etc.).

Program data 124 may include a list of programs that may be executed on the mobile device. A program may include, for example, an application or software. Program data 124 may also include a list of types of information that may be viewed on the mobile device. A type of information may include, for example, news, sports news, a date, an outside temperature, etc. In some instances, a type of information is determined by a (e.g., background) program's execution.

Program data 124 may include a an informational cue, such as a selectable feature, associated with each of one or more programs and/or information types. For example, one or more programs and/or information types may be associated with a user-selectable graphical icon, text, button, or other option. A user's selection of the user-selectable feature may cause an associated program to execute or may cause specific information of the selected type to be displayed. In some instances, a user need not select a user-selectable feature in order for a program to execute or to view information from an information type. Program data 124 may include a description of a program or information type and/or keywords (e.g., a title of a program).

Program data 124 may include associations between one or more contexts and one or more informational cues, programs and/or information types. An informational cue may be associated with a program or information type, such that associating a context with an informational cue further associates the context with a program or information type, and associating a context with a program or information type further associates the context with an informational cue. In some embodiments, a context may be generally associated with one or more (and in some instances, a fixed number of) programs and/or information types; and/or a program/information type may be associated with one or more context. In some embodiments, a context may be associated with a plurality (or all) programs or information types, each with a discrete or continuous association weight. Associations and related features (e.g., association weights, rankings, etc.) may be based on, e.g., a system's predictions of how interested a user would be in using the program or viewing the information type given a determined context (described further below) and/or based on user input (e.g., defining a weight or program ranking) A system's prediction may be based on, for example: data provided by a programmer, user preferences, and/or historical analysis of programs used in particular contexts.

In certain embodiments, program data 124 corresponding to different contexts can have a nested structure. In these instances, if a context is determined at a low (e.g., more precise) level, the specificity of the context may allow a more accurate determination as to which programs or information types a user will be interested in using or viewing. For example, as opposed to a high-level context of "at work," a context may be "at a meeting with client A". A processor may identify that some programs that the user uses while "at work" are never used while meeting with client A, while others are used with a relatively high frequency. For example, the user may never use a scanning application while meeting with client A but routinely use a dictation application. Thus, a more limited and/or better tailored set of program icons may be presented to a user in the more precise context.

User data 126 may include information expressly entered by a user and/or information determined about a user based on the user's use of the mobile device. For example, user data 126 may include indicators that particular programs or information types are to be predominately displayed in one, more or all contexts. User data 126 may include preferences in terms of how one or more programs and/or information types are to be presented to a user (e.g., a display of graphical icons of a particular size, location of icons or information, sound notifications, device vibrations, animations of text, or icons, etc.). User data 126 may include a user's definition (e.g., a name and/or a description) of one or more pre-existing or new contexts. User data 126 may include demographic information about the user or the mobile device 110 (e.g., types of sensors on the mobile device). User data 126 may include preferences about a partitioning of a display (e.g., a fraction, perimeter, or area of a display to be dynamic).

One or both of processor 112 of the mobile device 110 and processor 142 of the server 140 may be coupled to storage device 114 of mobile device 110 and/or storage device 144 of the server 140. One or both of these processors may perform any step or method described herein. As described in greater detail below, a processor may analyze context data 122 in order to determine a current context or a future context. A processor may then analyze program data 124 in order to determine programs or information types associated with the context. In one embodiment, the associated programs and/or information types are initially determined by system algorithms and subsequently refined based on user data 126 (e.g., over-riding associations). Based at least partly on the determination of programs or information types, a processor may identify one or more informational cues to be predominately presented to a user. In some instances, a display screen on mobile device 110 may predominately display the associated informational cues.

Figure 2:
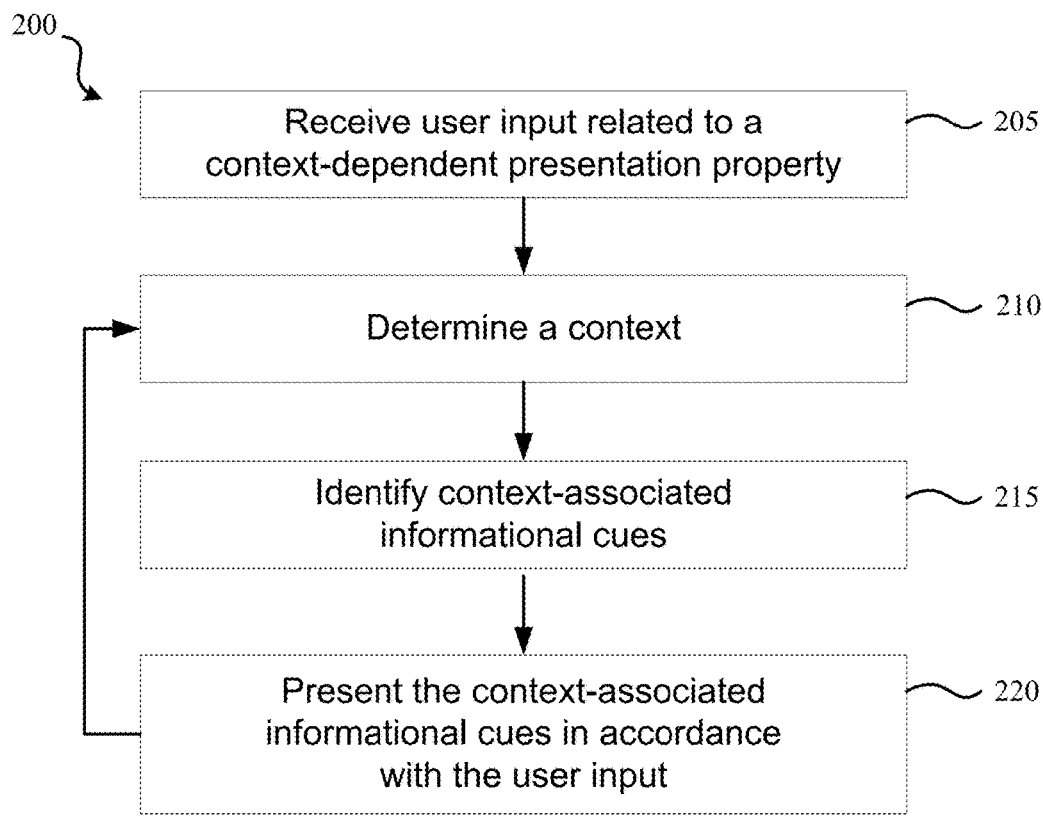
FIG. 2 shows a method according to an embodiment of the invention for configuring a dynamic user interface.

FIG. 2 shows a method 200 according to an embodiment of the invention for configuring a dynamic user interface. At 205, user input related to a context-dependent presentation property is received. The presentation property may indicate, for example, a general type of signal (e.g., visual, audio, vibrating, etc.) used to present context-associated programs and/or information types to a user. As another example, the presentation property may indicate a particular type of signal (e.g., a sound clip, an intra-display location for icons, a vibration duration, etc.) used to present the programs and/or information types. In some instances, the presentation property is fixed across contexts. For example, context-dependent informational cues (e.g., identifying available programs or information types) may be consistently presented within a fixed portion of a screen, or a vibration may always indicate identification of a new context. In some instances, the presentation property includes different values, definitions, etc. for different contexts. The user input may include, e.g., a selection amongst displayed options, a touch-screen input (e.g., drawing a perimeter of around a portion of a screen to display the context-associated programs and/or information types), manual input (e.g., entering a percentage of a screen to devote to display of the context-associated programs and/or information types using a keyboard), etc.

At 210, a context is determined. Contexts determinations are described in more detail below. Contexts may be determined based partly or completely on: user inputs, event detections, or inferences supported by received context-associated variables.

At 215, context-associated informational cues (e.g., each being associated with one or more programs and/or information types) are identified. This identification is described in more detail below. Context-associated informational cues may be partly or completely determined based on: user inputs, historical user-specific analysis of program use and information viewing, program descriptions, etc. In some instances, context-associated programs and/or information types are identified (e.g., separately or as part of an identification of context-associated informational cues). An information type associated with a context may or may not include a notification that a context was identified (e.g., a deal context was identified). Programs associated with a context may or may not include a program at least partly used to determine the context.

At 220, the context-associated informational cues are presented in accordance with the user input, such that presentation of the informational cues may accord with the user input. For example, if a user defined a portion of a screen as being dynamic or context dependent, context-associated graphical informational cues may be presented in the defined portion. As another example, if a user identified a signal to be associated with context-associated informational cues (e.g., to enlarge associated graphical icons, add animation, etc.), the context-associated informational cues may be presented via or along with the identified signal.

Figure 3:
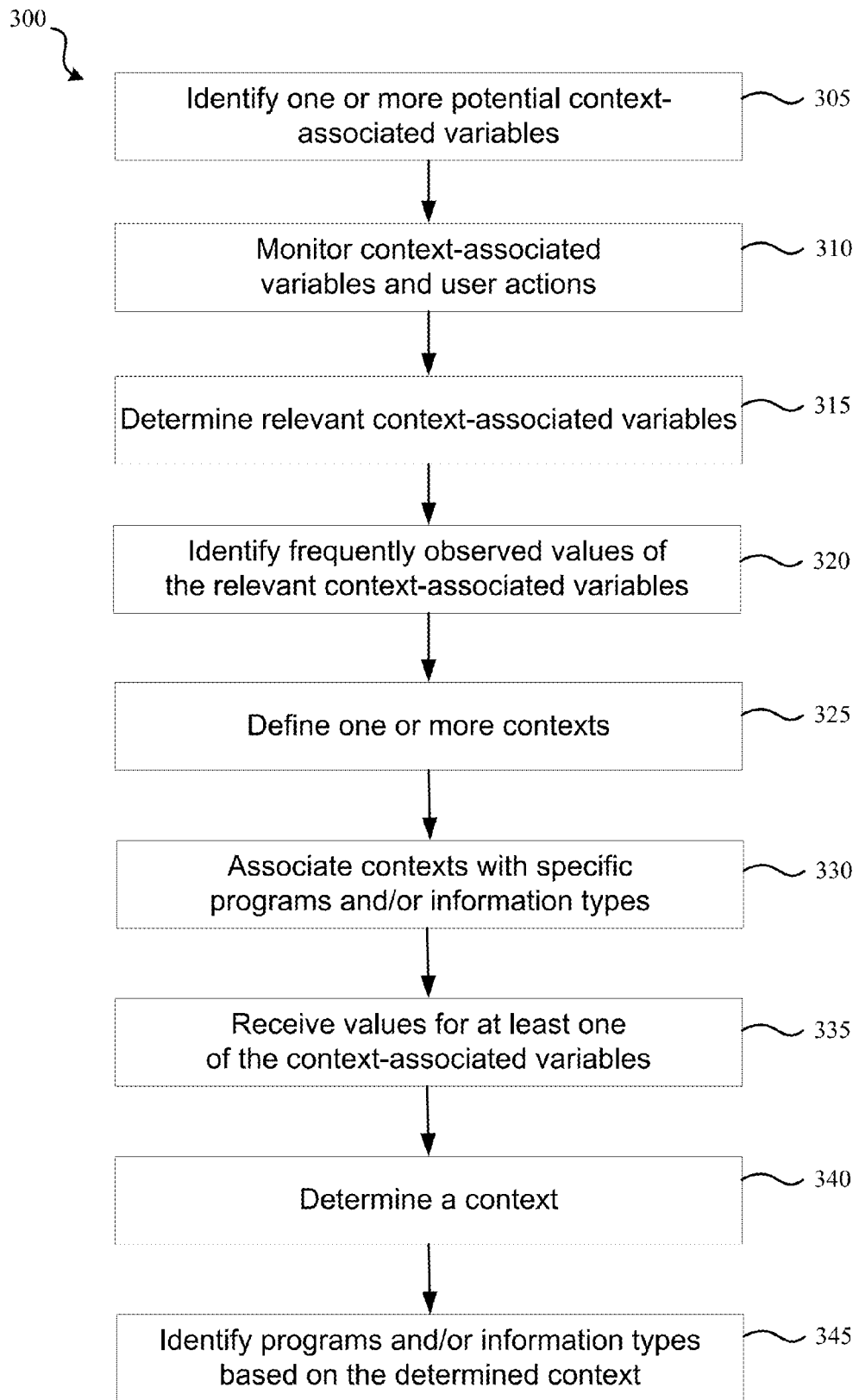
FIG. 3 shows a method according to an embodiment of the invention for configuring a dynamic user interface.

FIG. 3 shows a method 300 according to an embodiment of the invention for configuring a dynamic user interface. At 305, one or more potential context-associated variables are identified. Examples of context-associated variables are listed above. The variables may be identified based on, for example, standard settings, user inputs, available sensors on or in communication with a mobile device or a processor performing the identification, or program data.

At 310, context-associated variables and user actions are monitored. User actions may include, for example, user inputs (e.g., identifying a current location of a device as "home"), selection of a program for execution of the device, viewing of a type of information, etc. At 315, relevant context-associated variables are determined. Relevant context-associated variables may be determined, e.g., by identifying which of the monitored context-associated variables: were frequently determinable, exhibited a desired variability (e.g., above a threshold or within a particular range), exhibited at least minimal consistency, were clustered within a plurality of ranges, were correlated with user actions, were likely to be highly predictive of contexts, etc. In some instances, a user identifies relevant context-associated variables. In some instances, all of the potential context-associated variables are determined to be relevant.

At 320, frequently observed values of the relevant context-associated variables are identified. The values of the relevant context-associated variables may include, for example: numbers, integers, real numbers, scaled numbers, binary identifiers, words, categories, etc. The frequently observed values may include one or more ranges of values. For example, monitored data may indicate that a mobile device is very frequently near one of three GPS coordinates. Therefore, the frequently observed values may include three ranges of GPS coordinates surrounding the three GPS coordinates.

At 325, contexts are defined. A defined context may include: identification of context-associated variables informative as to whether a mobile device is in the context, weights indicating how informative various context-associated variables are as to whether the mobile device is in the context, values of context-associated variables associated with the context, and/or a context name.

In some embodiments, the context is defined based on values of the identified context-associated variables. Contexts may be defined based on repeated occurrences of different particular values of the relevant context-associated variables. Contexts may be defined, for example, by using a clustering algorithm (e.g., principal component analysis) to identify clusters of values of the relevant context-associated variables. For example, monitored data may indicate that a mobile device is frequently in one of two states, each state corresponding to a different: geographic location, reception strength, and user-selected ringer tone. In some instances, contexts are at least partly defined by a user (e.g., identifying a current location as "home").

In some embodiments, a context is defined based on user inputs. For example, a user may input that four contexts exist or that a "new" context exists in addition to any stored contexts. The contexts may be named or not. In some instances, one or more contexts are not associated with any context-associated variables used to infer whether the user is in the context. (Thus, for example, in some embodiments, method 300 does not include 201, 310 and/or 315.) Instead, for example, the system may rely on user inputs to indicate when a user is in a given context.

At 330, one or more contexts are associated with specific programs and/or types of information. Specific programs and/or information types associated with a context may be determined at least partly based on one or more of: data monitored in 310, user inputs, data monitored after the context is defined, analysis of a context (e.g., an architecture-firm work setting), analysis of other users' use of programs and/or information types, analysis of programs' and/or information types' objectives, etc. Each context may be associated with zero, one or more programs and/or one or more information types. The association may be binary (either being associated or not) or not. For example, a context may be associated with a plurality of programs and/or information types, but a weighting of the associations may vary among the programs and/or information types. In some instances, a weighted association is determined between a context and each of a plurality of programs and/or information types. In some instances, the context is then only associated with programs and/or information types having an association weight above a particular threshold (e.g., above a particular value or among the highest weights).

At 335, values are received for at least one of the context-associated variables. In some instances, the received values do not include values for all variables that may be useful in identifying a context (e.g., because a mobile device's speaker has not been activated to measure a background noise). In some instances, the absence of a received variable may itself be a received value of a context-associated variable. The values may be automatically received and/or available (e.g., to mobile device 110 or remote server 140) or may be in response to a request for the values (e.g., from mobile device 110 or remote server 140).

At 340, a context is determined. In some embodiments, the context is inferred based on the defined contexts and received values. For example, each of the defined clusters may correspond to a cluster of values of various context-associated variables (e.g., "Cluster #1" corresponding to a downtown location, a weekday, a silent ring, and a low background noise). A context may be inferred by identifying which cluster most closely includes the received values (e.g., based on a strict or weighted distance measure). A context inference may be associated with a confidence value or range. In some instances, multiple contexts are inferred, and each context may be associated with a confidence metric. The context may include a past, present or future context.

In some embodiments, a context is determined based partly or completely on user input. Thus, in some instances, method 300 does not receive values for context-associated variables at 335. For example, a user may select an option indicating that he is in "Context B" or the "Home" context. In some embodiments, a context is determined based on a detection of an event. For example, a stock price rising above a threshold, a flight price dropping below a threshold, a release of a new movie, etc. could allow a system to determine a particular event-detection context. In some embodiments, the context is determined without regard to any context-associated variables.

A user may be notified of the context determination. For example, a visual signal (e.g., on a device display screen), an animation, a sound signal, a radio signal, a wireless signal, a vibration signal, etc. could indicate that a context generally has been determined or that a specific context has been determined. For example, different sound clips may be associated with a plurality of environmental contexts. A sound clip could be played upon determination that the device is in an associated context.

At 345, programs and/or types of information are identified based on the determined context. The programs and/or types of information may comprise those predicted to be of interest to a user given the determined context. The programs and/or information types may be those associated with the determined context at 330. The identified programs and/or information types may include a subset of a total dynamic set of programs and/or information types, as described in greater detail below. In one embodiment, a single context is determined in 340, and some or all of the programs and/or information types associated with the context (from 330) are those identified at 345.

In another embodiment, multiple contexts are determined in 340 (e.g., each associated with a confidence metric). Specific programs and/or information types may be identified based at least partly on confidence metrics associated with each determined context and/or association weights between each determined context and each program and/or information type. Each program and/or information type may be assigned an importance value equal to an across-context sum of its context association weight multiplied by a context-determination confidence metric. A threshold or ranking algorithm may then be used to determine which of the programs and/or information types would be of interest to a user. For example, suppose that a context determination includes: a 90% probability that the device is in Context A and a 10% probability that that the device is in Context B. Further suppose that association-weight vectors for four programs are [1, 0.5, 0, 0.2] for Context A and [1, 1, 0.2, 0.5] for Context B. An importance-value vector for the four programs would be equal to: 0.9*[1, 0.5, 0, 0.2]+0.1*[1, 1, 0.2, 0.5]=[1.0, 0.55, 0.02, 0.23].

Each of the identified programs and/or information types may be associated with an informational cue (e.g., a graphical icon, a visual effect, an animation, a vibration, static text, time-dependent text, etc.). Informational cues associated with the identified programs and/or information types may then be presented to a user.

Figure 4:
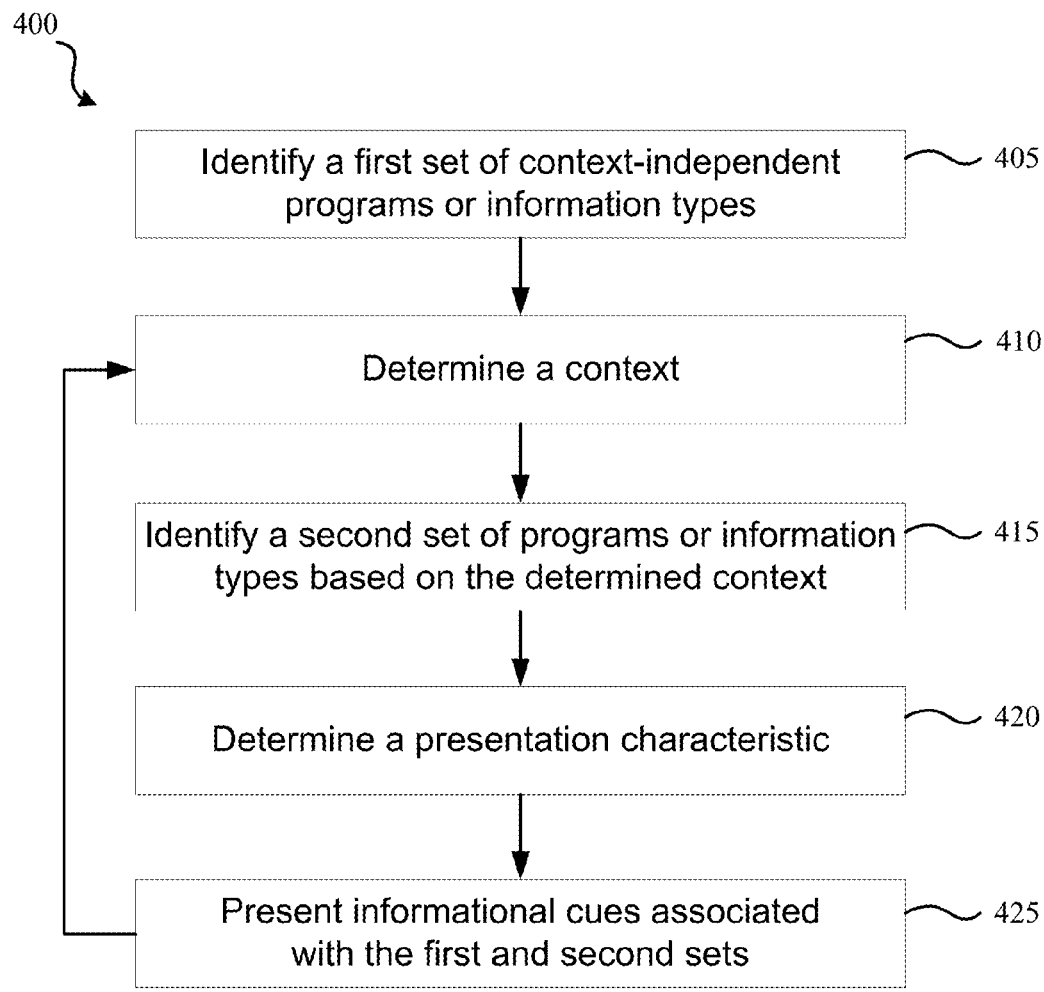
FIG. 4 shows an embodiment of a method for identifying programs and/or information types based on a context.

FIG. 4 shows an embodiment of a method 400 for presenting informational cues. At 405, a first set of programs and/or types of information is identified. The first set of programs and/or information types may be at least partly context-independent. For example, the first set may comprise programs and/or information types to always be presented to a user. In some embodiments, one, more or all presentation characteristics associated with a presentation of the programs or information types (e.g., a display location, an icon size, a font, etc.) is context independent. The first set of programs and/or information types may be identified based on predictions that the programs and/or information types will be useful across contexts. These predictions may be based on, e.g., monitored user actions and/or the specific utility of the programs and/or information types. The first set of programs and/or information types may be at least partly or completely determined based on user inputs.

At 410, a current or future context is determined. The context may be determined based on, e.g., a method as described in relation to FIG. 3.

At 415, a second set of programs and/or types of information is identified based at least partly on the determined context. In this manner, identities of programs and/or information types of the second set may be influenced by the determined context. The determination may be determined based on, e.g., a method as described in relation to FIG. 3. In some instances, the first set of context-independent programs or information types is first identified. Associations may then be formed between the remaining programs and/or information types and one or more contexts. The second set of programs and/or information types may include some (e.g., all programs and/or information types having a particular association weight above a threshold) or all of those associated with one or more determined contexts (e.g., see the description of 345 in relation to FIG. 3).

In some embodiments, the second set of programs and/or information types includes only programs and/or information types not currently executing and/or not currently being presented via informational cues. In some embodiments, the second set of programs and/or information types may include those currently executing and/or being presented via informational cues. The second set of programs and/or information types may or may not include a program used to determine a context and/or determine a program-associated variable. For example, in some instances, Program A detects an event which is associated with Context A'. The second set may consist of Program A, comprise Program A (in addition to other programs and/or information types associated with Context A'), or may not include Program A.

In some instances, the second set of programs and/or types of information is at least partly fixed. For example, the second set of programs may include at least three programs regardless of the context. In such instances, presentation characteristics may vary across presented programs and/or types of information to emphasize particular programs and/or information types based on the determined context. In some instances, the identity of the second set of programs and/or information types is entirely context dependent, such that no programs and/or information types are necessarily presented regardless of an determined context.

In some instances, a number of programs and/or types of information in the second set must equal a set number or be within a set range. The set number may be determined directly from user input (e.g., a user inputs that "4" programs should be displayed in a dynamic portion of a screen), indirectly from user input (e.g., determining that 8 program icons could be displayed in a user-defined dynamic portion of a screen), or without user input. As one example, the second set may need to include exactly eight total programs and/or types of information. As another example, the second set may need to include exactly four programs and four types of information. As another example, the second set may need to include at least two, four, or eight programs. The number or ranges At 420, one or more presentation characteristics are determined. Presentation characteristics include any property influencing how a device presents a program and/or information type to a user (e.g., how an informational cue is presented). Examples of types of presentation characteristics include: intra-display location, size, font size, font style, color, animation, pop-up, sound, etc. One or more presentation characteristics (e.g., icon size) may be determined for informational cues associated with one, more or all programs and/or information types of the second set. The presentation characteristics may depend on the determined context. For example, presentation characteristics associated with a single informational cue identifying a single available program may include: large icon size, default font style and size, top-right corner of display, no animation, and playing of audio clip upon mouse-over the icon.

In some embodiments, one or more presentation characteristics (e.g., size, font size, and font style) are the same across all informational cues associated with the first set, all informational cues associated with the second set, or all informational cues associated with both the first and second sets. In some embodiments, one or more presentation characteristics (e.g., location and/or size) vary across presentations of informational cues of the second set (or of the first set). For example, a second set may include a plurality of programs, each represented by a graphical icon (an informational cue). The graphical icons may all be presented at a different screen location such that the user can view all of the icons. The size of the icons may vary depending on a predicted probability that a user will be interested in each of the programs. As another example, an icon with a highest association weight given a determined context may be animated. In some instances, distributions of presentation characteristics (e.g., size distributions of displayed icons) are similar or the same across contexts. In some instances, distributions of presentation characteristics are different across contexts (e.g., an icon is animated in Context A but no icons are animated in Context B).

At 425, informational cues associated with the first set and with the second set are (e.g., simultaneously) presented. The presentation may include displaying representations of the programs and/or information types (or information itself) in a display of a device. Programs may be represented by, e.g., an icon or text. Information types may similarly be represented (e.g., sports news may be represented by a newspaper icon), or information corresponding to the type (e.g., GPS coordinates) may itself be displayed.

Presentation may also or alternatively including: playing generic or program- or information-type-specific sound signals; vibrating a device; flashing a display screen, sending radio signals from a device, etc.

In some instances, informational cues associated with the first set are presented separately from informational cues associated with the second set. For example, a mobile device's screen may include a static portion to present the informational cues associated with first set and a dynamic portion to present the informational cues associated with second set. The dynamic and static portions may each be continuous or include multiple discrete elements. The dynamic and static portions may, in sum, compose the entire, or less than the entire, screen. As another example, a mobile device's screen may visually present the first set of programs, and the second set may be presented to the user, e.g., by emitting sound signals, vibrating a device, etc.

Figure 5:
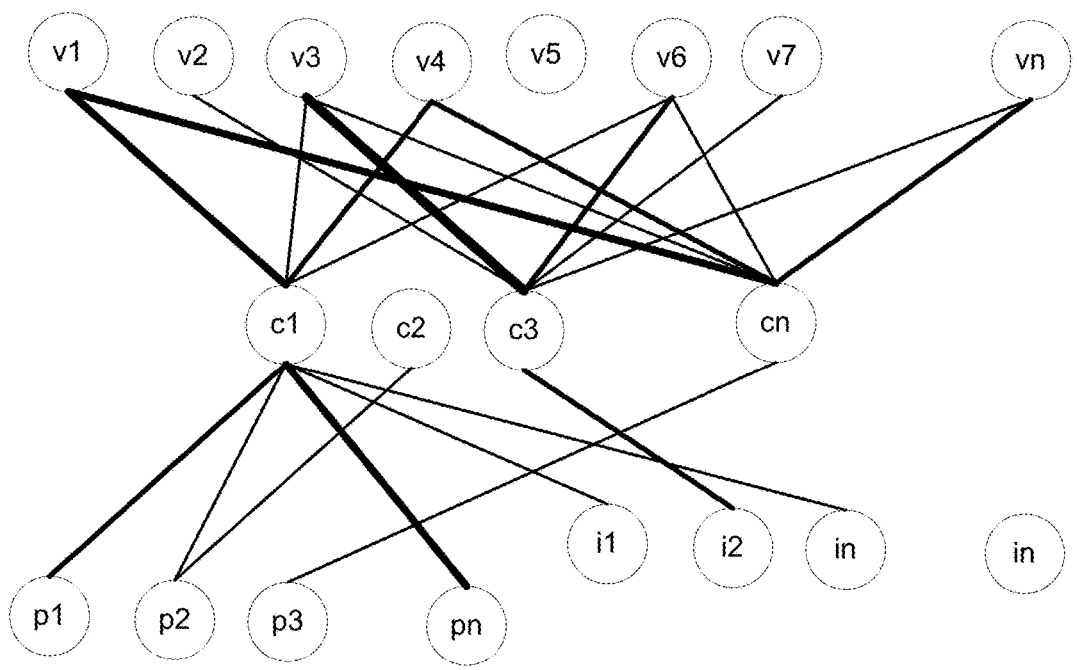
FIG. 5 shows an embodiment of associations between context-dependent variables, contexts, programs, and information types.

FIG. 5 shows an embodiment of associations between context-dependent variables, contexts, programs, and information types. A plurality of potential context-associated variables $v1, v2, \ldots vn$ are identified. Each variable may be associated with one or more contexts ($c1, c2, \ldots cn$). The line thicknesses in FIG. 5 correspond to weights, such that thick lines indicate that a given variable is identified as being very indicative of a context. For example, "v1" may correspond to GPS coordinates, "c1" may correspond to a work context, and "cn" may correspond to a home context. GPS coordinates may be highly informative as to whether a device is in a work context and whether a device is in a home context. Therefore, there is a high association weight.

A plurality of programs ($p1, p2, \ldots pn$) and/or types of information ($i1, i2, \ldots in$) are also identified. Each context may be associated with one or more programs and/or information types. The association may relate to a probability that a user will use a given program or view a given type of information or a user-defined context-dependent interest in a given program. Again, the association may be weighted. For example, "c1" may correspond to a work context, and "pn" may correspond to a work email program that is routinely used in this context. Frequent use of the work email program at work or a strong logical connection between the context and program may result in a high association weight between c1 and pn.

The association network shown in FIG. 5 may be a fixed network, a dynamic network and/or a "learning" network. A dynamic network, e.g., may allow "nodes" associated with each variable, context, program, and/or information type to be added or deleted and/or association weights to be adjusted. These dynamics may be at least partly determined based on user input and/or monitored data (e.g., programs actually used by a user when in a given context). The association network may comprise a neural network.

Figure 6:
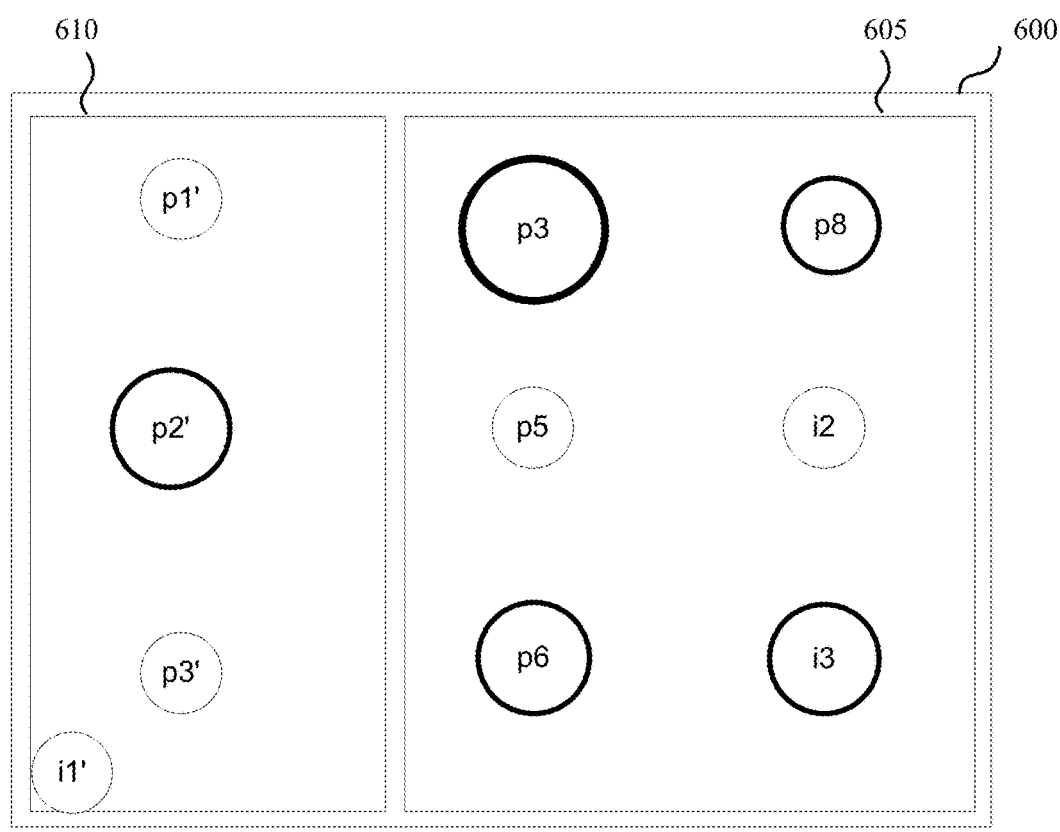
FIG. 6 shows an example of a screen of a mobile device.

FIG. 6 shows an example of a screen 600 of a mobile device. The screen may include a dynamic portion 605 and a static portion 610. Static portion 610 may present, e.g., informational cues identifying context-independent programs (p1', p2', and p3') and/or information types (i1'). Dynamic portion 605 may present informational cues identifying context-dependent programs (p3, p5, p6, and p8) and/or information types (i2 and i3). Static and/or dynamic portions may include an area that is at least, about, or less than 0%, 3%, 5%, 10%, 20%, 50%, 80%, 90%, 95% 97% or 100% of the screen. In some embodiments, one or both of static and dynamic portions include an area that represents at least 10% or at least 50% of the screen. In some instances, display 600 does not include a static portion presenting informational cues identifying context-independent programs (and/or information types). Regions corresponding to static and/or dynamic portions may be fixed or variable. For example, the size and location of one or both regions may depend upon a number of programs predicted to be of interest to a user given a determined context.

In some embodiments, a user defines one or more areas of the screen corresponding to dynamic portion 605 and/or static portion 610. For example, a user may use a finger or pointing device to draw a partial or full, approximate or actual perimeter of an area on a screen to be defined as a dynamic region. As another example, a user may use a finger or pointing device to identify a coordinate of a vertical or horizontal edge of a rectangular area on a screen that is to be defined as a dynamic region. As yet another example, a user may input a variable indicating a portion of a screen (e.g., a fraction, percentage or weight) that he wishes to be dynamic and include presentation of informational cues identifying context-dependent programs and/or information types. Further examples include: user selections between system-generated display-partitioning options, indications of a number of programs and/or information types to be displayed in dynamic portion 605, etc.

In some embodiments, dynamic portion 605 and static portion 610 include different appearance characteristics. For example, backgrounds, icon size, icon spacing, etc. may be different between the portions. In some embodiments, dynamic portion 605 and static portion 610 are separated by a visual marker (e.g., a line separating the portions, a box around one or both of the portions, etc. In some embodiments, dynamic portion 605 and static portion 610 include different navigational controls. For example, dynamic portion 605 may include a scrolling feature (e.g., a scroll bar or ability to scroll using a track pad). The scrolling feature may allow a user to view some of, e.g., informational cues identifying identified dynamic programs and/or information types in the dynamic portion, and, upon use of the scrolling feature, view informational cues identifying other of the programs and/or information types. Static portion 610 may additionally or alternatively include a scrolling feature.

As shown in FIG. 6, informational cues associated with different programs and information types may include different presentation characteristics. For example, informational cues may be of different sizes and include different "boldness" (coloring, background, highlighting, font size, etc.). Presentation characteristics may vary across informational cues depending on a user's predicted interest. For example, informational cues associated with programs and/or information types predicted to be of greater interest may be predominately sized (e.g., larger), predominately located (e.g., located near the top or center of the display), predominately highlighted (e.g., with a border or brighter icon or font colors), predominately sound-featured (e.g., accompanied by a mouse-over sound clip while others are not), predominately animated (e.g., a flashing icon or moving icon), etc. In some instances, dynamic portion 605 presents informational cues associated with a full set of programs and/or information types, with presentation characteristics distinguishing programs and/or information types of predicted interest from others. In some instances, a dynamic portion only presents a subset of a set of informational cues, the subset being identified at least partly based on a determined context. Presentation characteristics may or may not vary across this subset (e.g., based on a predicted-interest weight).

In some instances, static portion 610 is completely static—with presentations of programs and/or information types always remaining the same. In some instances, the identity of the presented programs and/or information types always remains the same (or is changed only based on user settings), but presentation characteristics may vary. The presentation characteristics may vary based on user settings and/or contexts. In some instances, dynamic portion 605 is more context dependent than static portion 610. For example, if presentation characteristics associated with informational cues presented in static portion 610 depend on context, context-dependent variability of informational cues' presentation characteristics may be more dramatic in dynamic portion 605.

FIG. 6 shows an embodiment of selectively displaying a subset of a dynamic set of informational cues (e.g., each identifying a program or information type). In some embodiments, the subset is selectively presented using other means. For example, sound signals associated with the subset may be emitted from a device, wireless signals corresponding to the subset may be transmitted from the device, etc.

Figure 7:
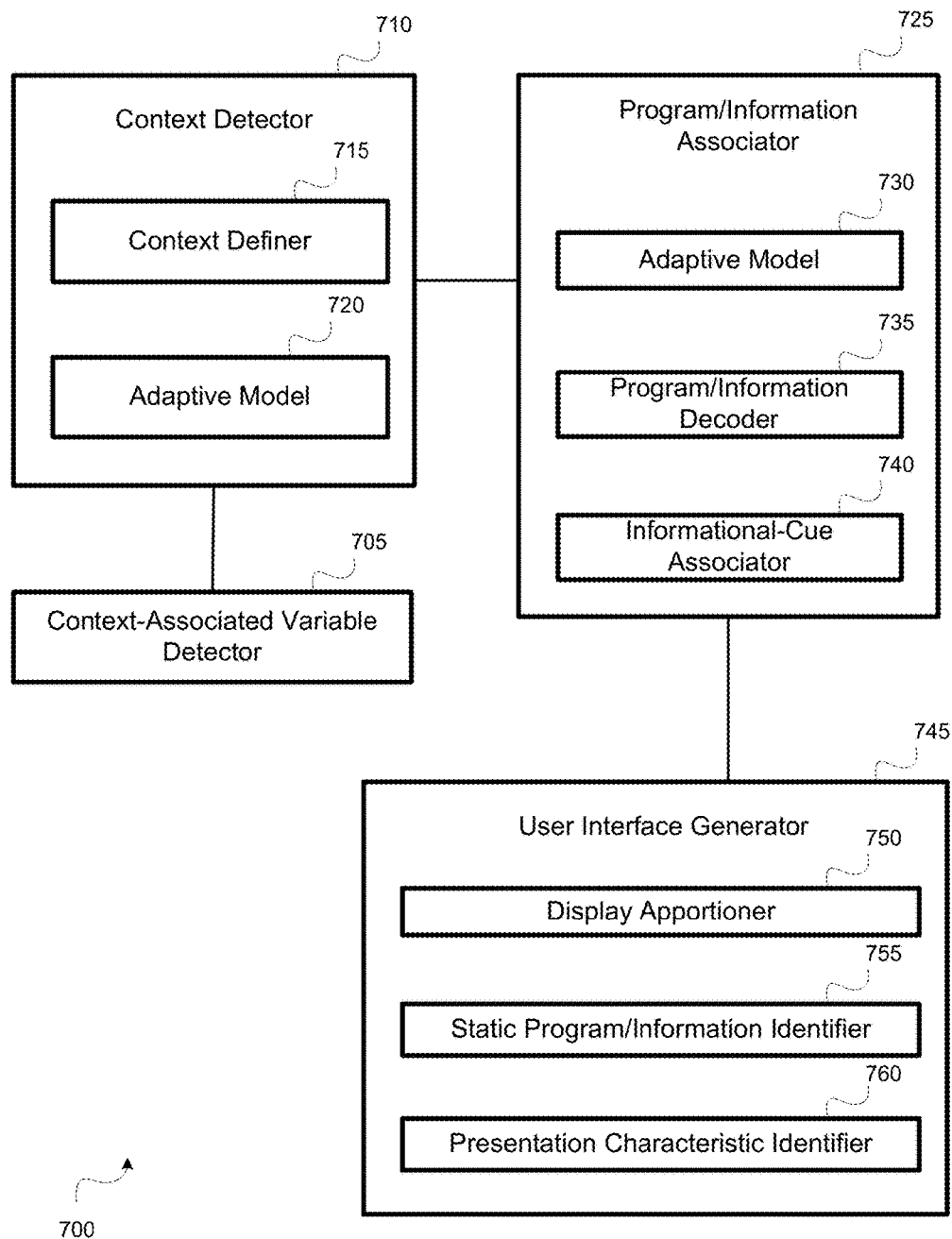
FIG. 7 shows an embodiment of a system for inferring a context and generating a display.

FIG. 7 shows an embodiment of a system 700 for generating a user interface or display. System 700 may include a context-associated variable detector 705. Context-associated variable detector 705 may comprise one or more sensors and/or may receive (e.g., via transmission over a network) signals from one or more sensors. Sensors may be on mobile device 110, coupled to mobile device 110 or external and not coupled to mobile device 110. For example, context-associated variable detector 705 may detect a location of mobile device 110 (e.g., by GPS coordinates, signals received by receivers indicating that mobile device 110 is proximal to the receivers, data input by a user of mobile device 110, etc.). Context-associated variable detector 705 may detect calendar events stored on mobile device 110.

System 700 may include a context detector 710 configured to determine a context. Context detector 710 may receive variables detected by context-associated variable detector 705. Context detector 710 may include a context definer 715 that defines contexts. A context definition may include (weighted or unweighted) associations between a context and one or more variables, a context probability, a context name, etc. Context definitions may be stored, e.g., as context data 122 in storage device 114 or 144. In some instances, context detector 710 includes an adaptive model 720.

Adaptive model 720 may identify and/or dynamically adjust associations between contexts and context-associated variables and/or dynamically adjust weights of these associations. For example, adaptive model 720 may include a clustering algorithm to form cumulative or time-weighted clusters of context-associated variables. In some instances, clusters are formed primarily based on context-associated variable data and/or sensor data. For example, context-associated variable detector 705 may detect, over the period of a week, the following variables: GPS coordinates, time of day, and ring volume. The data may form two predominate clusters—one associated with a work location, work hours, and a silent ring volume, and the other associated with a home location, home hours, and a loud ring volume. In some instances, clusters are formed at least partly based on programs used and/or information viewed by a user of a mobile device. For example, a first cluster may relate to instances associated with a user's use of an email application, and a second cluster may relate to a user's viewing of news.

Variables most informative as to cluster identity may be used to define contexts and/or highly weighted, and values of these variables associated with one or more contexts may be dynamically adjusted. Thus, for example, an adaptive model may initially identify two context clusters: one associated with times 9 AM, 1 PM, and 3 PM and a location of "downtown," and the other associated with 8 PM and a location of "suburb." The adaptive model may, e.g., associate times before 5:30 PM with cluster 1 and times after 5:30 with cluster 2. After more data is gathered, this distinction could be adjusted based on more detailed data as to when the transition between cluster 1 and cluster 2 is likely to occur.

Context detector 710 may be coupled to a program/information associator 725. Program/information associator 725 may associate one or more contexts with one or more programs and/or information types. In some instances, some or all associations are weighted (e.g., based on a predicted probability of use). Program/information associator may include an adaptive model 730 configured to identify and/or dynamically adjust associations between contexts and programs/information types.

In some instances, adaptive model 730 assigns weights between a context and one or more programs and/or types of information. High weights may correspond to: (1) a high predicted probability that a user will use the program or view the information given the context; and/or (2) an indicated user interest in presenting the program and/or information type when in the given context. The weights may be assigned based on past usage and viewing data and past context-associated variable data. Recent activity patterns and/or user preferences may be more influential in determining the weights.

In some instances, adaptive model 730 includes a clustering algorithm that clusters programs and/or information types. For example, within a one hour time frame, a user may execute Programs A, B and F and view information G, and within another one hour time frame, a user may execute Programs C, D and F and view information N. This data set may then correspond to two data points. Data collected over time may allow for identification of sets of programs and/or information types predicted to be of interest to a user within a single context. Each context may then, e.g., be associated with one or more sets of programs and/or information types.

Adaptive model 730 may have similar features to adaptive model 720 in context detector 710. In some instances, the two are combined into a single model. For example, rather than modeling a relationship between context-associated variables and contexts and separately modeling a relationship between contexts and programs/information types of interest, a single model may model a relationship between context-associated variables and programs/information types of interest.

Program/information associator 725 may include program/information decoder 730. Program/information decoder 730 may analyze one or more programs and/or information types to predict contexts in which a user would be interested in using the program and/or viewing the information type. For example, program/information decoder may analyze a name, description, metadata, user input, or population-based usage or viewing statistics associated with a program or type of information.

Program/information associator 725 may determine and/or output one or more of the following: dynamic programs/information types to be presented (e.g., via associated informational cues) upon determination of a context, weights of associations between a determined context and a plurality of programs/information types, a number of dynamic programs/information types predicted to be displayed based on an determined context, a context-dependent ranking of programs/information types sorted by predicted interest, a user-provided context-dependent ranking of programs/information types, a user-provided or system-generated context-independent ranking of programs/information types etc. Any or all of these may be stored, e.g., as program data 124 in storage device 114 or 144.

In some instances, program/information associator 725 further includes an informational-cue associator 740 that associates particular programs and/or information types with an informational cue (e.g., graphical icon, signal or text). Thus, program/information associator 725 may, by use of informational-cue associator 740, associate one or more informational cues with a given context. The association may be determined based on an indirect technique (e.g., associating a context with one or more programs and/or information types and associated the one or more programs and/or information types with one or more informational cues) or direct (e.g., associating a context directly with one or more informational cues). Direct associations may be made using similar techniques described herein for other types of associations (e.g., using a clustering algorithm, adaptive model, etc.) In some instances, informational cue associator 740 is provided separately from program/information associator.

Program/information associator 725 may include associations based on user inputs. For example, a user may indicate conditions under which he wishes one or more particular informational cues to be presented or one or more programs and/or information types to be identified. For example, a user may indicate that he wishes a graphical icon associated particular program to be presented upon receiving an email from a specific person(s) or email address(es). Such an indication may, e.g., amount to a user defining a context, selecting between contexts, etc.

Program/information associator 725 may be coupled to a user interface generator 745. User interface generator 745 may be configured to notify a user of a system-identified context and/or associated program or information type. For example, user interface generator 745 may include a display generator, a sound generator, a vibration generator, etc. A generated signal may have a general meaning (e.g., that a context is determined or programs and/or information types are identified). A generated signal may have a specific meaning (e.g., a sound signal representing that a new deal is detected or a visual icon presented on a desktop allowing a user to easily access a context-associated program).

User interface generator 745 may include a display apportioner 750. Display apportioner may apportion a display screen between a static portion and dynamic portion, each of which are described in greater detail above with reference to FIG. 6. The apportioning may be based on, e.g., a number of programs or types of information associated with a determined context and/or user input at least partly defining a dynamic portion of a screen (e.g., defining a perimeter of a dynamic portion, defining a percentage of a screen to be allocated to the dynamic portion, etc.). In some instances, the apportioning between the static and dynamic portions is fixed across contexts. FIG. 6 shows an example of a screen apportioned between a static portion and a dynamic portion. In some embodiments, the entire screen is a dynamic portion or the entire screen is a static portion (e.g., and a user is notified of context-associated programs and/or information types via, e.g., sound signals, display flashes, etc.).

User interface generator 745 may include a static program identifier 755. Static program identifier may identify programs and/or types of information to be presented regardless of an determined context. In some instances, these programs are at least partly defined based on user inputs.

User interface generator 745 may include a presentation characteristic identifier 760. Presentation characteristic identifier 760 may identify characteristics associated with presenting informational cue(s) associated with one or more static and/or dynamic program and/or types of information. Presentation characteristics are described in greater detail above with reference to FIG. 4. In one instance, informational cue(s) associated with one or more programs and/or information types predicted to be of interest to a user given an determined context may be associated with predominate presentation characteristics. For example, a user may have provided a ranked list of programs to be associated with a context. Informational cues (e.g., graphical icons) associated with highly ranked programs may be presented more prominently than lower-ranked programs (e.g., at a top location, at a center location, in a different location, etc.). A user may or may not be able to set or modify rank-varying presentation characteristics.

User interface generator 745 may be coupled to a display (e.g., of mobile device 110), speaker, vibrator, and/or to a processor (e.g., to generate text and/or icons to be displayed on the display).

Figure 8:
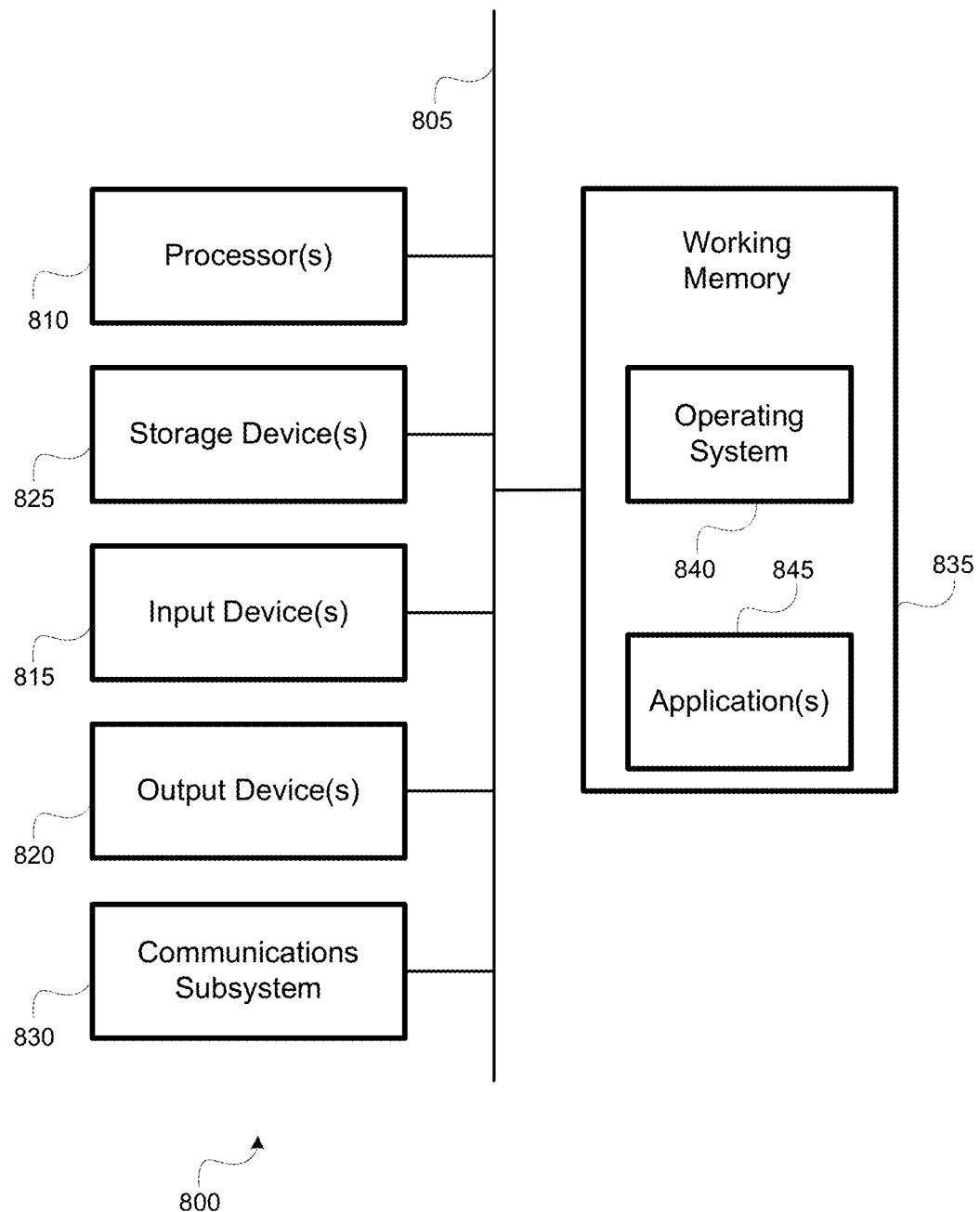
FIG. 8 illustrates an embodiment of a computer system.

FIG. 8 provides a schematic illustration of one embodiment of a computer system 800 that can perform the methods provided by various other embodiments, as described herein. Remote server 140 and/or mobile device 110 may include one or more components of system 800. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

Computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, touch screens, track pads and/or the like; and one or more output devices 820, which can include without limitation a display device, a printer and/or the like.

Computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

Computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

Computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as computer system 800) to perform methods in accordance with various embodiments of the invention. According to a set of embodiments, some or all of the procedures of such methods are performed by computer system 800 in response to processor 810 executing one or more sequences of one or more instructions (which might be incorporated into operating system 840 and/or other code, such as an application program 845) contained in working memory 835. Such instructions may be read into working memory 835 from another computer-readable medium, such as one or more of the storage device(s) 825. Merely by way of example, execution of the sequences of instructions contained in working memory 835 might cause processor(s) 810 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using computer system 800, various computer-readable media might be involved in providing instructions/code to processor(s) 810 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as storage device(s) 825. Volatile media include, without limitation, dynamic memory, such as working memory 835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, etc.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. All or part of methods may be repeatedly performed. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, in instances in which "programs" are described, the disclosure may, in some embodiments, also or alternatively relate to "types of information." The converse may also occur. As another example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for generating a mobile device's user interface, the method comprising:
   receiving, via the mobile device, input from a user of the mobile device, the input being related to a selection of a notification area within a graphical user interface (GUI) for presenting dynamic context-dependent informational cues;
   determining one or more context-associated variables associated with an environment in which the mobile device is or has been located;
   determining a future context by identifying cumulative or time-weighted clusters of values of the one or more context-associated variables, the future context determined based on the one or more context-associated variables;
   identifying a subset of a set of informational cues, the subset being associated with the future context; and
   presenting, via the mobile device, the identified subset within the notification area to the user, and hiding other informational cues in the set of informational cues, wherein the identified subset is presented prior to occurrence of the future context,
   wherein the presentation accords with the received user input,
   wherein the set of informational cues represent programs executable on the mobile device, each of the set of informational cues comprising a graphical icon associated with a respective one of the programs, and
   wherein the future context is determined, and the subset of informational cues is identified and presented, prior to execution of any of the programs.

2. The method of claim 1, wherein the set of informational cues comprises an alert of the future context.

3. The method of claim 1, wherein the set of informational cues comprises an alert of a deal.

4. The method of claim 1, wherein the future context is determined based on previously received context-defining user input.

5. The method of claim 4, wherein the previously received context-defining user input identifies one or more conditions for displaying the subset of the set of informational cues.

6. The method of claim 5, wherein the one or more conditions comprise receiving an email from one or more specific senders.

7. The method of claim 1, wherein the input comprises an actual or approximate border of a dynamic portion of a screen on the mobile device for visually presenting the identified subset.

8. The method of claim 7, wherein the input comprises one or more touch-screen-drawn borders.

9. The method of claim 7, wherein the dynamic portion comprises a plurality of regions of a screen on the mobile device, the plurality of regions covering less than an entirety of the screen.

10. The method of claim 1, wherein the identified subset are visually presented within a system-defined portion of a screen on the mobile device.

11. The method of claim 1, wherein one or more informational cues of the set of informational cues are associated with a plurality of contexts.

12. The method of claim 1, wherein the identified subset is presented with at least one scrolling feature, such that the identified subset is not simultaneously presented in its entirety on a screen of the mobile device.

13. The method of claim 1, further comprising: ranking at least some of the informational cues of the set of informational cues, wherein the presentation of the identified subset is based at least partly on the ranking.

14. The method of claim 13, wherein a screen location associated with the presentation of each of the informational cues of the identified subset of the set of informational cues is based at least partly on the ranking.

15. The method of claim 1, wherein the input comprises a selection between a plurality of system-generated screen partitioning options.

16. The method of claim 1, wherein presenting the identified subset comprises displaying graphical icons associated with the subset as compared to any display of graphical icons associated with the other informational cues in the set of informational cues.

17. The method of claim 1, wherein informational cues in the subset are visually presented to the user on a display screen of the mobile device, and the other informational cues are not visually presented to the user on the display screen.

18. The method of claim 1, wherein informational cues in the subset are visually presented to the user on a desktop or home screen of the mobile device, and the other informational cues are not visually presented to the user on the desktop or home screen.

19. The method of claim 1, wherein the subset comprises an informational cue indicating that the future context was determined.

20. The method of claim 19, wherein the informational cue indicating that the future context was determined is presented to the user using a at least one of a sound and a vibration of the mobile device.

21. The method of claim 1, further comprising presenting, via the mobile device, a static context-independent set of informational cues to the user.

22. The method of claim 1, wherein the mobile device is a cellular phone.

23. The method of claim 1, further comprising: receiving one or more context-associated variables, wherein determining the future context comprises inferring the context based on the received one or more context-associated variable.

24. The method of claim 1, further comprising:
determining a second context;
identifying a second subset of the set of informational cues, the second subset being associated with the second context; and
presenting, via the mobile device, the second subset as compared to any presentation of other informational cues in the set of informational cues,
wherein the presentation accords with the received user input, and
wherein the second subset is different than the subset.

25. The method of claim 1, wherein the subset is identified based at least partly on user inputs associating programs with the future context, the programs being executable on the mobile device.

26. The method of claim 1, further comprising:
monitoring the user's interactions with programs executable on the mobile device;
identifying a correlation between the user's interactions and a context-associated variable;
receiving a value of the context-associated variable; and
inferring the future context based on the identified correlation and the received value.

27. The method of claim 1, wherein the future context is selected from a plurality of future contexts, the future context selected based on a determination that the one or more context-associated variables indicate that the future context has a highest probability of occurring from among the plurality of future contexts.

28. The method of claim 1, wherein the identifying the subset of informational cues includes:
selecting the subset of informational cues from the set of informational cues by determining that the subset is the highest probability subset from among the set of informational cues of corresponding to the future context, the probability determined based on the one or more context-associated variables.

29. A processor-readable non-transitory medium comprising processor readable instructions configured to cause a processor to:
receive input from a user of the mobile device, the input being related to a selection of a user specified notification area within a graphical user interface (GUI) for presenting dynamic context-dependent informational cues;
determine one or more context-associated variables associated with an environment in which the mobile device is or has been located;
determine a future context by identifying cumulative or time-weighted clusters of values of the one or more context-associated variables, the future context determined based on the one or more context-associated variables;
associate the determined future context with a subset of a set of informational cues; and
generate a user interface that presents the subset within the notification area and hides presentation of other informational cues in the set of informational cues, wherein the user interface that presents the subset is generated prior to occurrence of the future context,
wherein the presentation of the subset accords with the received user input,
wherein the set of informational cues represent programs executable on the mobile device, each of the set of informational cues comprising a graphical icon associated with a respective one of the programs, and wherein the future context is determined, and the subset of informational cues is identified and presented, prior to execution of any of the programs.

30. The processor-readable non-transitory medium of claim 29, wherein the processor readable instructions are further configured to cause the processor to define a portion of a display of the mobile device for displaying the dynamic context-dependent informational cues, the defining depending on the user input.

31. The processor-readable non-transitory medium of claim 29, wherein the processor readable instructions are further configured to cause the processor to at least periodically adjust a plurality of context definitions.

32. The processor-readable non-transitory medium of claim 29, wherein the processor readable instructions are further configured to cause the processor to at least periodically adjust associations between contexts and portions of the set of informational cues.

33. A system for generating a mobile device's user interface, the system comprising:
an input device configured to receive an input from a user of the mobile device, the input being related to a selection of a user specified notification area within a graphical user interface (GUI) for presenting dynamic context-dependent informational cues; and
one or more processors programmed with computer-executable instructions to:
determine one or more context-associated variables associated with an environment in which the mobile device is or has been located;
determine a future context by identifying cumulative or time-weighted clusters of values of the one or more context-associated variables, the future context determined based on the one or more context-associated variables;
identify a subset of a set of informational cues, the subset being associated with the future context; and
generate the user interface to present the identified subset within the notification area to the user, the presentation comprising presenting the identified subset and hiding other informational cues in the set of informational cues, wherein the user interface is generated to present the identified subset prior to occurrence of the future context,
wherein the presentation accords with the received user input,
wherein the set of informational cues represent programs executable on the mobile device, each of the set of informational cues comprising a graphical icon associated with a respective one of the programs, and
wherein the future context is determined, and the subset of informational cues is identified and presented, prior to execution of any of the programs.

34. The system of claim 33, wherein the mobile device comprises the one or more processors.

35. The system of claim 33, wherein an external computer comprises at least one of the one or more processors, and wherein the external computer is coupled to the mobile device via a wireless connection.

36. The system of claim 33, wherein the mobile device further comprises one or more sensors configured to monitor one or more context-associated variables.

37. A system for generating a user interface, the system comprising:
means for receiving input from a user of a mobile device, the input being related to a selection of a user specified notification area within a graphical user interface (GUI) for presenting dynamic context-dependent informational cues;
means for determining one or more context-associated variables associated with an environment in which the mobile device is or has been located;
means for determining a future context by identifying cumulative or time-weighted clusters of values of the one or more context-associated variables, the future context determined based on the one or more context-associated variables;
means for identifying a subset of a set of informational cues, the subset being associated with the future context; and
means for presenting the identified subset within the notification area and hiding presentation of other informational cues in the set of informational cues, wherein the presentation accords with the received user input, wherein the identified subset is presented prior to occurrence of the future context,
wherein the set of informational cues represent programs executable on the mobile device, each of the set of informational cues comprising a graphical icon associated with a respective one of the programs, and
wherein the means for determining the future context is configured to determine the future context, the means for identifying is configured to identify the subset of informational cues, and the means for presenting is configured to present the identified subset, prior to execution of any of the programs.

38. The system of claim 37, wherein the means for identifying the subset comprises using a neural network.

39. The system of claim 37, wherein the means for receiving input comprises a touch screen.

* * * * *